C. M. COSSET.
PIVOTED LUG FOR THE BACK FORKS OF BICYCLES.
APPLICATION FILED FEB. 28, 1910.
972,510.
Patented Oct. 11, 1910.
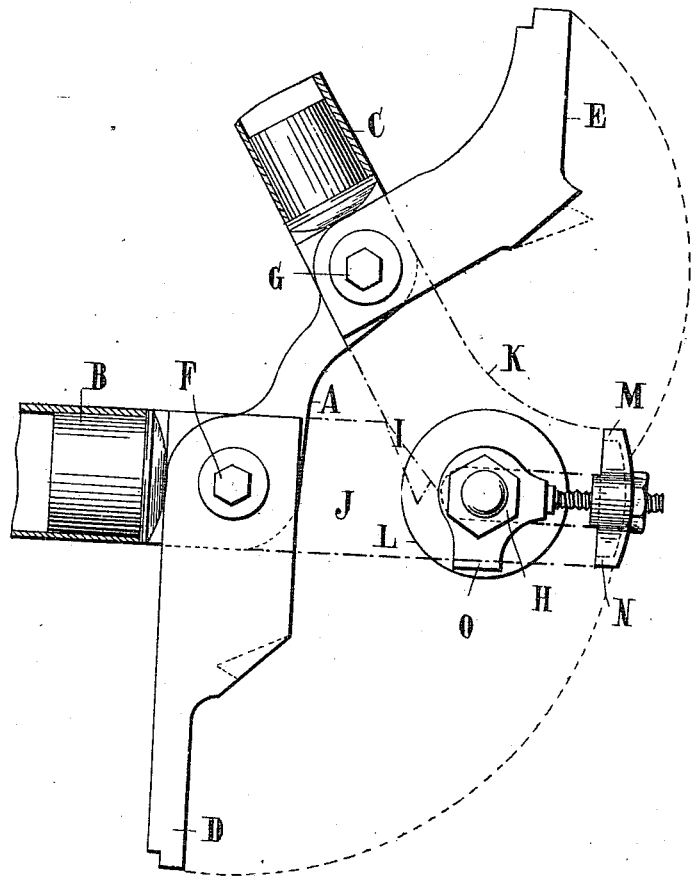
WITNESSES
Corinne Myers,
Thomas Donnellan.
INVENTOR
Constant Marcel Cosset
BY L. K. Böhm
his ATTORNEY.

UNITED STATES PATENT OFFICE.

CONSTANT MARCEL COSSET, OF PARIS, FRANCE.

PIVOTED LUG FOR THE BACK FORKS OF BICYCLES.

972,510.  Specification of Letters Patent.  Patented Oct. 11, 1910.

Application filed February 26, 1910. Serial No. 546,097.

*To all whom it may concern:*

Be it known that I, CONSTANT MARCEL COSSET, engineer, resident of Paris, Seine, France, have invented new and useful Improvements in Pivoted Lugs for the Back Forks of Bicycles, which improvements are fully set forth in the following specification.

This invention relates to a construction of a pivoted lug for the back fork of bicycles, enabling the tire of the back wheel to be removed without removing the wheel from the frame and without disturbing its alinement.

In order to make the construction and the working of the lug in question clearly understood, it is shown in the accompanying drawing in which a pivoted lug for the back fork of bicycles is represented in side elevation embodying in desirable form the present improvements.

The lug in question is constructed as follows: A bent brace A is provided at each end B C with a plug intended to be braced to the tube of the fork. The pivoted lug made preferably of two parts D E is secured to the said brace. It will be understood that for replacing the tire without removing the wheel and getting it out of alinement, it is sufficient to unscrew the screws F G and the nut H of the axle of the hub. Then, after having disengaged the ends of the lugs D E from the tension cap I, and after having opened the two portions of the said lug D E, it will be possible to pass the tire through the opening J K which has been produced between the end of the hub L and the brace A. After having introduced the tire into the frame of the bicycle, the two parts of the lug D E must be put back in place and then the screws F G as well as the nut H, tightened again. While the tire is being removed from the frame by means of the pivoted lug D E or is being put back again, the wheel always remains secured to the other lug of the usual shape, without being put out of alinement, and without it being necessary to withdraw the chain from the pinions. As soon as the two pivoted parts D E have been put back in place as well as the tension cap I, and the screws F and G and the nut H tightened, the parts D E can no longer shift as they are engaged with the right angle parts arranged for the purpose at each end M N of the tension cap and of the bottom part O of the tension device. While keeping the same device, the lug D E can be also made in one piece and movable, and then it will be withdrawn by unscrewing the screws F G and the nut H from the spindle of the hub.

I claim as my invention:

1. A pivoted lug for the back fork of bicycles to permit of removing the tire without disturbing the back wheel, comprising a bent brace on the tube of the fork, a pivoted lug on said brace, a tension device on the axle of the wheel having a cap with rectangular portion adapted to receive the free end of the lug, and means for tightening the device.

2. A pivoted lug for the back fork of bicycles to permit of removing the tire without disturbing the rear wheel, comprising a bent brace on the tube of the back fork, two lug parts pivoted to said brace adapted to be moved onto and away from the wheel tension devices, and means for tightening the two lug parts when in normal position.

3. A pivoted lug for the back fork of bicycles to permit of removing the tire without disturbing the rear wheel, comprising a bent brace on the tube of the back fork, two lug parts pivoted one each to one end of said brace, and a tension cap provided with rectangular portions at the end adapted to receive the free ends of the lug parts, and means for tightening the device.

In testimony whereof I have signed this specification in the presence of two subscribing witnesses.

CONSTANT MARCEL COSSET.

Witnesses:
 EMILE LEDRET,
 H. C. COXE.